(No Model.)  3 Sheets—Sheet 2.
W. R. PATTERSON.
SYSTEM OF LAYING SUBTERRANEAN ELECTRICAL CONDUCTORS.
No. 281,722. Patented July 24, 1883.
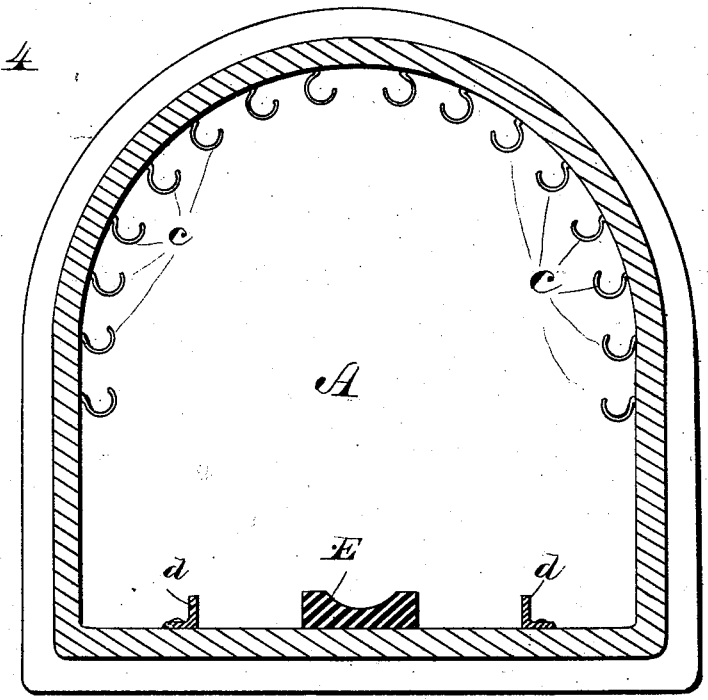
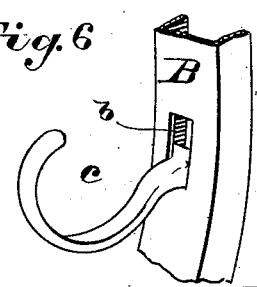
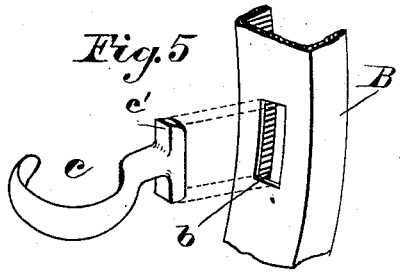
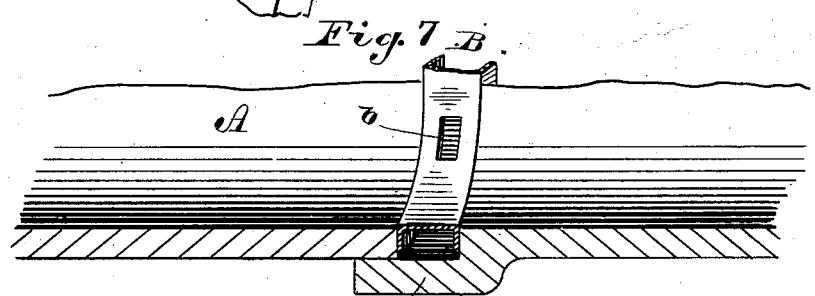
Attest
Paul A. Staley,
Chas. A. Warren.
Inventor
William R. Patterson
By George P. Barton
Attorney (No Model.) 3 Sheets—Sheet 3.
W. R. PATTERSON.
SYSTEM OF LAYING SUBTERRANEAN ELECTRICAL CONDUCTORS.
No. 281,722. Patented July 24, 1883.
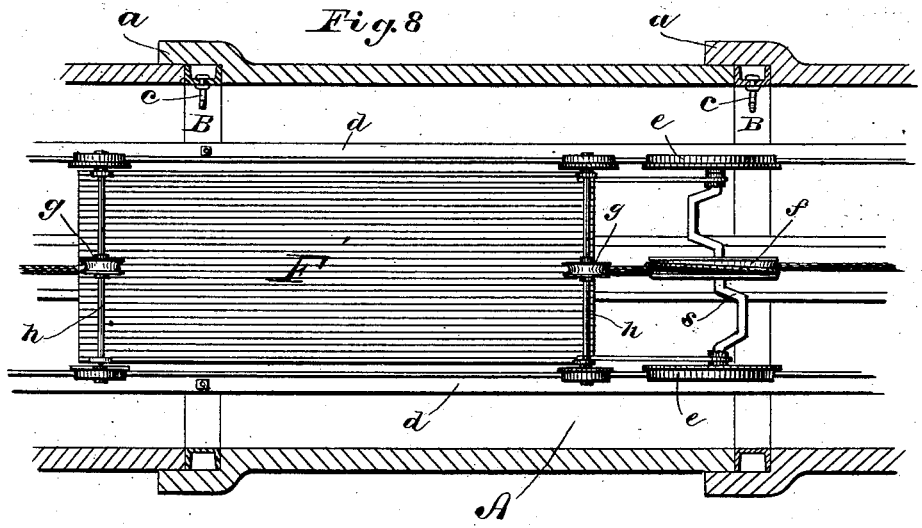
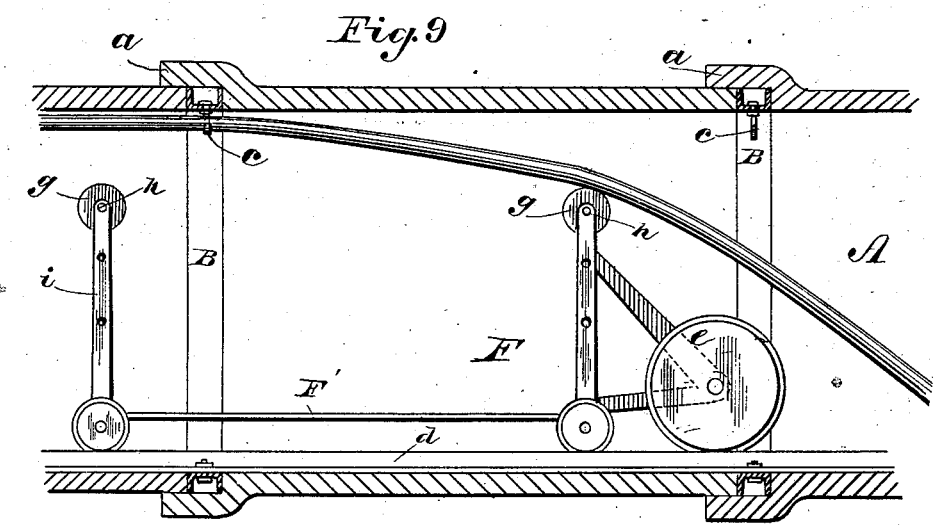
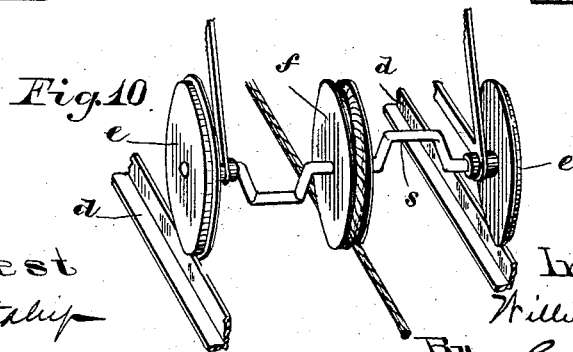
Attest
Paul A. Staley
Chas. A. Warren
Inventor
William R. Patterson
By George P. Barton
Attorney

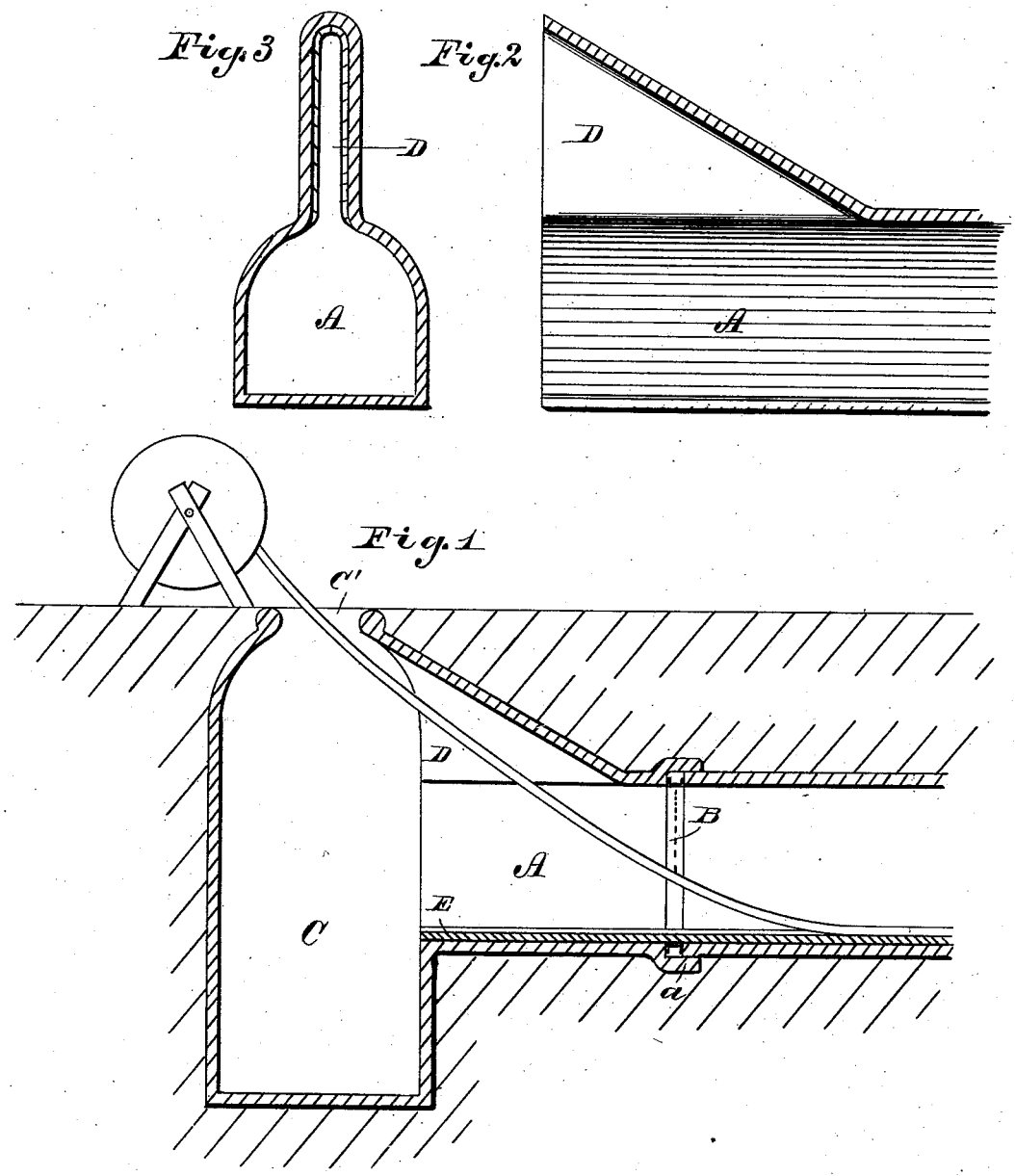

UNITED STATES PATENT OFFICE.

WILLIAM R. PATTERSON, OF CHICAGO, ILLINOIS, ASSIGNOR TO THE WESTERN ELECTRIC COMPANY, OF SAME PLACE.

SYSTEM OF LAYING SUBTERRANEAN ELECTRICAL CONDUCTORS.

SPECIFICATION forming part of Letters Patent No. 281,722, dated July 24, 1883.

Application filed May 7, 1883. (No model.)

*To all whom it may concern:*

Be it known that I, WILLIAM R. PATTERSON, a citizen of the United States, residing at Chicago, in the county of Cook and State of Illinois, have invented a certain new and useful Improvement in Systems of Laying Subterranean Electrical Conductors, of which the following is a full, clear, concise, and exact description, reference being had to the accompanying drawings, forming a part of this specification.

My invention relates to a system of laying subterranean electrical conductors.

Heretofore conduits of various kinds have been employed for laying electrical conductors underground. Of these conduits some have been large enough to permit a person to enter and make repairs at any point in the length of the conductors, which are usually made up into cables. This class of conduits, while perhaps the best and most efficient, are objectionable on account of the expense necessarily involved in their construction. In other conduits which have been used the cables are drawn into their places from enlarged chambers, which are placed at convenient points along the length of the conduit, the conduits themselves being too small to permit of access to the conductors therein. Each of these chambers, which are usually termed "test-chambers," is provided with an opening or manhole, which opens into the street, through which access may be had for drawing in the conductors or for making repairs. In some of these conduits the cables containing the conductors are simply drawn in and allowed to lie in a bunch at the bottom of the conduit. Others are provided with independent tubes or supports, through which each cable is run separately. In this class of conduits, in case a cable needs to be repaired, it is disconnected at the test-chambers on each side of the break and the piece which is to be repaired drawn out. When the cables are all bunched together, in order to draw out one of the lower cables for repairs, it would be necessary to remove all the upper ones before it could be drawn out. When the cables are each run through independent tubes or supports, this difficulty is obviated; but a serious difficulty is experienced in drawing the cables into place, which is usually accomplished by wires left in the conduit when it is built. In case one of the wires should break, in order to replace it, it is sometimes necessary to dig up the conduit. In my improved system I use a conduit of novel construction, whereby I am enabled to draw the cables directly thereinto from a reel on the surface of the ground without the aid of other pulleys, as heretofore. I also arrange the cables around the sides and top of the conduit in such a manner that a sufficient space is left at the bottom for a car adapted to carry a workman, while lying upon the car, through the conduit. This car, which is propelled by the workman thereon, is adapted to run under each cable after it has been drawn into the conduit, and thus raise it to such a position above the workman that he can easily secure it in its place in the conduit. Each cable is suspended by detachable supporting-hooks, which will be more fully described hereinafter.

In the accompanying drawings, which are illustrative of my invention, Figure 1 is a sectional elevation view of a conduit embodying some of the features of my invention. The view represents one of the terminal stations. Figs. 2 and 3 are detailed views of the same.
Fig. 4 is a transverse sectional view, showing the detachable supports by which the cables are suspended in place. Figs. 5, 6, and 7 are views of the detachable supports in detail. Figs. 8 and 9 are respectively a horizontal longitudinal sectional and a vertical longitudinal sectional view of a portion of the conduit, showing the car used for placing the cables in or removing them from their places in the conduit. Fig. 10 is a detailed view of a portion of the car.

The conduit A, I prefer to make in sections of concrete—such as is used for making sewer-pipes—the different sections being joined together by providing one end of each section with a flange, a, into which the end of the next succeeding section extends in the ordinary manner. These flanges I make about twice the length of the ordinary flange as used for sewer or other pipe, and in each flange, between the different sections, I place a ring or hoop, B, made, preferably, of channel-iron, and adapted when in place to stand flush with or a trifle beyond the inner face of the conduit all the way round. These hoops or rings B are provided, at suitable distances apart, with slotted openings $b$, into which the hooks $c$, by which the cables are suspended, are adapted to be secured. These hooks $c$ are provided with elongated heads $c'$, which stand at right angles to the plane of the hook, in such a manner that when slipped through the slotted holes $b$ and turned until the hook is brought into an upright position, it is held firmly in the ring B. When the cable is placed in the hook, as hereinafter set forth, the hook is prevented from turning, and consequently cannot come out as long as the cable is in place. At each test or terminal chamber C, I provide the conduit at the top with a vertical longitudinal angular slot, D, which extends upward to the man-hole $C'$, which opens into said chamber C. By this construction I am enabled to draw the cables into the conduit from a reel placed at the surface of the ground, without the aid of pulleys to guide them into place. (See Fig. 1.) To prevent the cables from being damaged by abrasion as they are drawn into the conduit, and to guide them into position to be raised by the car, I provide a wooden box or trough, E, placed at the bottom of the conduit and secured at suitable intervals to the hoops or rings B.

On each side of the trough E is a rail, $d$, on which runs the car F. These rails are preferably made of angle-iron, and are secured to the hoops or rings B by bolts or otherwise, and thus serve also to strengthen the conduit. The car F consists of a platform, $F'$, mounted upon suitable flanged wheels, which run on the rails $d$. At the forward end of the car, supported in suitable bearings, is a double-crank shaft, $s$, provided at each end with a large flanged wheel, $e$, which runs on the rail $d$, and provided at the center with a grooved wheel or pulley, $f$, of the same diameter as the traction-wheels $e$.

Supported over the platform $F'$ at each end of the car are grooved or flanged pulleys $g\ g$, for raising the cable, as hereinafter described. These pulleys $g\ g$ turn on shafts $h\ h$, each of which is supported at either end by standards $i\ i$, rising from the sides of the platform. The pulleys are held in position on the shaft by collars, and are adapted to be moved longitudinally along the shaft, so as to be brought under the row of hooks into which the cable is to be placed. The standards $i$ are provided with holes, into which a stud may be inserted, and one of the pulleys $g$ placed on said stud when the cable is to be placed on the lower hooks.

The manner of laying a cable is as follows: The conduit being properly completed and ready to receive the cables, the car F is placed in the conduit on the track. The car will generally have to be put through the man-hole in pieces and set up in the conduit, as the opening $C'$ is not sufficiently large to permit it to be taken in whole. A temporary track is laid across each test-chamber and the car placed thereon. A workman then places himself on his back on the platform of the car, and, taking the end of a rope with him, proceeds through the conduit to the next test-chamber by placing his feet on the cranks of the double-crank shaft $s$ and revolving the traction-wheels $e\ e$ on the rails $d$. The rope which he has thus carried through the conduit is drawn up through the vertical longitudinal slot and out at the man-hole of the farther test-chamber. A reel containing the cable to be drawn in is then placed over the man-hole at the first test-chamber, and the end of the rope which has been carried through the conduit attached to the end of the cable. The other end of the rope is then attached to a windlass or equivalent device at the farther test-chamber and the cable drawn through. The cable, as it is drawn in, passes through the angular slot D, which is lined with wood to prevent abrasion, and into the wooden trough or box E, which is in line with said slot, and is thus prevented from being damaged by abrasion, and is left in position to be raised up by the car, as follows: One end of the cable is placed on the pulleys $g\ g$, over the platform, on which the workman again takes his place. The car is then run to the first ring or hoop B, thus raising the cable up over the workman, who inserts one of the supporting-hooks $c$ into the ring or hoop B in the position shown in Fig. 5, after which it is turned as shown in Fig. 6, and the cable placed thereon. The workman then proceeds through the conduit, repeating the operation at each succeeding ring B. The entire operation is then repeated until all the cables are in place.

If the cable is very large and comes up to the car at such an angle that the traction of the wheels $e\ e$ is insufficient to carry the car under the cable, a rope is first drawn through, as before described, which is given a turn or two around the grooved wheel $f$ on the shaft $s$. It is then drawn taut and the ends made fast at the respective test-chambers. Upon turning the double-crank shaft $s$ the rope will be wound up on one side of the pulley $f$ and paid out on the other, thus carrying the car forward.

The cables are made in lengths corresponding to the distance between the test-chambers, and are spliced at said test-chambers after being drawn into the conduit. The splicing may be done before the cables are placed on the hooks or afterward, just as will best suit the convenience of the workmen.

In case a cable is to be repaired, a workman goes through the conduit on the car and transfers the desired cable from the hooks to the pulleys $g\ g$, from whence, as he proceeds onward, it is laid into the wooden trough E, ready to be drawn out.

It is obvious that the conduit may be made of various materials besides the concrete sections. If desired, it may be made of iron cast in similar sections, or it may be built of masonry, the rings or hoops B being built therein.

A conduit as above described is very simple, can be easily laid, and is very strong. The hoops or rings B, being placed permanently in position at intervals in the length of the conduit when it is built, add materially to the strength thereof. The supporting-hooks, being detachable, need not be placed in position until the cables are to be suspended. The permanent hoops or rings are thus left perfectly plain while the conduit is being built, and therefore are not at all liable to be damaged, and will not require any great care in setting them in place.

The conduit may be made in cross-section of any desired shape except at the test-chambers, where the vertical longitudinal angular slots are formed, as and for the purpose set forth.

I claim—

1. A conduit for subterranean electric conductors, provided at the terminal or intermediate test-chambers with a vertical longitudinal angular slot, substantially as and for the purpose set forth.

2. In a conduit for subterranean electric conductors, the combination of permanent hoops or rings, placed at intervals in the length of said conduit, with detachable supports on which the conductors are suspended.

3. The combination, with a conduit composed of masonry or kindred material, of a wooden trough or box placed at the bottom of said conduit, and adapted to receive and guide the cables as they are drawn into the conduit, substantially as and for the purpose set forth.

4. The combination, with a conduit for subterranean electrical conductors, of a car adapted to be propelled by foot-power through said conduit, and to raise a cable into a position above the said car, from whence it may be easily suspended in place in the conduit, substantially as and for the purpose specified.

5. The combination, in a conduit for subterranean electrical conductors, of a wooden-lined vertical longitudinal angular slot at the terminal and intermediate test-chambers, with a wooden trough running longitudinally through the said conduit at the bottom, substantially as and for the purpose set forth.

6. In a conduit, the combination, with stationary hoops or rings B, placed at intervals in the length of said conduit and provided with slotted openings b, of hooks c, provided with elongated heads c', standing at an angle to the plane of the hook, substantially as and for the purpose specified.

7. The combination, with a car, F, adapted to be propelled through a conduit by foot-power, of supporting-pulleys supported on a shaft above the platform of the car, and adapted to be moved longitudinally on said shaft, substantially as set forth.

8. A conduit for underground cables, composed of sections of concrete or similar material, said sections being provided with flanges at one end, into which the end of the next succeeding section extends, in combination with permanent hoops or rings placed in the said flanges between the different sections, substantially as specified.

9. The combination, with a conduit provided with supports for suspending cables around its top and sides, of a car adapted to be propelled through said conduit and to raise the cables into position, substantially as specified.

10. The combination, with a conduit provided at the terminal and intermediate test-chambers with vertical longitudinal angular slots, of a wooden trough adapted to receive and guide the cable as it is drawn in, and a car adapted to run under the said cable, and thus raise it into position, substantially as specified.

In witness whereof I hereunto subscribe my name this 1st day of May, A. D. 1883.

WILLIAM R. PATTERSON.

Witnesses:
PAUL A. STALEY,
GEORGE P. BARTON.